(12) United States Patent
Fishman et al.

(10) Patent No.: US 9,647,902 B2
(45) Date of Patent: *May 9, 2017

(54) VIRTUALIZED NETWORK FOR VIRTUALIZED GUESTS AS AN INDEPENDENT OVERLAY OVER A PHYSICAL NETWORK

(71) Applicant: Ravello Systems Ltd., Raanana (IL)

(72) Inventors: Alexander Fishman, Raanana (IL); Gil Hoffer, Tel-Aviv (IL); Rami Tamir, Even Yehuda (IL); Benny Schnaider, Raanana (IL)

(73) Assignee: Ravello Systems Ltd., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,806

(22) Filed: Mar. 28, 2016

(65) Prior Publication Data

US 2016/0212018 A1    Jul. 21, 2016

Related U.S. Application Data

(63) Continuation of application No. 13/773,142, filed on Feb. 21, 2013, now Pat. No. 9,306,832.
(Continued)

(51) Int. Cl.
| | |
|---|---|
| *H04L 12/28* | (2006.01) |
| *H04L 12/56* | (2006.01) |
| *H04L 12/24* | (2006.01) |
| *H04L 12/701* | (2013.01) |
| *H04L 12/801* | (2013.01) |
| *H04L 12/715* | (2013.01) |

(Continued)

(52) U.S. Cl.
CPC .......... *H04L 41/50* (2013.01); *H04L 12/2856* (2013.01); *H04L 43/10* (2013.01); *H04L 45/00* (2013.01); *H04L 45/04* (2013.01); *H04L 45/64* (2013.01); *H04L 45/66* (2013.01); *H04L 47/10* (2013.01); *H04L 49/70* (2013.01); *H04L 61/6022* (2013.01); *H04L 41/12* (2013.01)

(58) Field of Classification Search
CPC ......... H04L 45/04; H04L 45/00; H04L 45/64; H04L 45/66; H04L 12/2856; H04L 41/12; H04L 47/10; H04L 49/70
USPC .................. 370/389, 386, 390, 254; 709/223
See application file for complete search history.

(56) References Cited

U.S. PATENT DOCUMENTS

| | | |
|---|---|---|
| 4,792,948 A | 12/1988 | Hangen et al. |
| 5,781,715 A | 7/1998 | Sheu |

(Continued)

*Primary Examiner* — Kyung H Shin
(74) *Attorney, Agent, or Firm* — Invoke

(57) ABSTRACT

An independent overlay and a method for creating an independent overlay of a virtualized network for virtualized hosts over a physical network to allow access between a first virtualized guest and a second virtualized guest over the physical network. The independent overlay includes a physical network; a first virtualized host instantiating thereon a first guest; a second virtualized host instantiating thereon a second guest, wherein a first communication port and a second communication port are communicatively connected to constitute a distributed communication element that enables a virtualized network for communication between the first guest and the second guest via the first communication port and the second communication port, respectively; and a media access (MAC) discovery mechanism.

18 Claims, 2 Drawing Sheets

Related U.S. Application Data

(60) Provisional application No. 61/603,387, filed on Feb. 27, 2012.

(51) Int. Cl.
  *H04L 12/931* (2013.01)
  *H04L 12/721* (2013.01)
  *H04L 12/26* (2006.01)
  *H04L 29/12* (2006.01)

(56) References Cited

U.S. PATENT DOCUMENTS

| | | |
|---|---|---|
| 5,848,227 A | 12/1998 | Sheu |
| 6,356,546 B1 | 3/2002 | Beshai |
| 6,580,721 B1 | 6/2003 | Beshai |
| 6,704,318 B1 | 3/2004 | Stuart et al. |
| 6,876,652 B1 | 4/2005 | Bell et al. |
| 7,039,046 B1 | 5/2006 | Simons et al. |
| 7,054,325 B1 | 5/2006 | Archibald |
| 7,295,519 B2 | 11/2007 | Sandy et al. |
| 7,310,349 B2 | 12/2007 | Beshai |
| 8,619,771 B2 * | 12/2013 | Lambeth ............... H04L 45/04 370/389 |
| 9,306,832 B2 | 4/2016 | Fishman et al. |
| 2002/0009078 A1 * | 1/2002 | Wilson ............... H04L 12/2856 370/389 |
| 2005/0180410 A1 | 8/2005 | Pepenella |
| 2006/0039369 A1 | 2/2006 | Perera et al. |
| 2007/0076719 A1 | 4/2007 | Allan et al. |
| 2007/0086364 A1 | 4/2007 | Ellis et al. |
| 2008/0049644 A1 * | 2/2008 | Halbert ............... H04L 41/12 370/254 |
| 2009/0293055 A1 | 11/2009 | Carroll et al. |

\* cited by examiner

VIRTUALIZED NETWORK FOR VIRTUALIZED GUESTS AS AN INDEPENDENT OVERLAY OVER A PHYSICAL NETWORK

CROSS-REFERENCE TO RELATED APPLICATIONS

This application is a continuation of U.S. patent application Ser. No. 13/773,142 filed on Feb. 21, 2013, now allowed, which claims the benefit of U.S. Provisional Patent Application No. 61/603,387 filed on Feb. 27, 2012, the contents of which are hereby incorporated by reference for all that they contain.

TECHNICAL FIELD

The invention generally relates to virtual machines (VMs), and more specifically to network switching in a virtualized network environment.

BACKGROUND

Communication between devices over a network is a well-established technology that has been around in one form or another for decades. In one manifestation, a network having various protocols is used that enables the delivery of packets of data from a source to a destination through various communication elements such as switches and routers.

Basically, a star topology is used with respect of the communication of the various devices through a switch. That is, all the devices are connected to a switch, which has an internal logic that then switches the packets to the desired direction. Hence, if a device A wishes to send a packet to a device B, a packet is sent to a switch which includes the network address of device B. The switch then routes the packet that was received by the switch to the device B being the packet's destination. Naturally more complex architectures may be used with this respect, but the basic concept is this kind of routing.

With the advance of virtual machines (VMs), it is also necessary to have network communication occurring between VMs. A VM is an operating environment that executes over a computing hardware with its own guest operating system (OS), at times simply referred to as a guest. A VM can execute applications that run within the confines of its respective OS. Currently, for the purpose of communication between VMs, and in particular between guests, the virtual environment mimics the physical environment by having a central switch, to which all packets of data that need to be transferred are routed, and that has the necessary logic to send the packets to the appropriate destinations. However, in the virtualized environment such a centralized implementation results in unnecessary overhead and complexity as well as a balancing issue, or even a need to dedicate a separate VM for the sole purpose of switching.

It would be therefore advantageous to provide a solution that overcomes the deficiencies of centralized communication between guests of VMs in a virtual environment.

SUMMARY

Certain exemplary embodiments disclosed herein include an independent overlay of a virtualized network for virtualized hosts over a physical network to allow access between a first virtualized guest and a second virtualized guest over the physical network. The independent overlay includes a physical network; a first virtualized host instantiating thereon a first guest, a first network interface card (NIC) communicatively connected to the physical network, a first communication port, and a first element of a distributed control logic to control at least the first communication port; a second virtualized host instantiating thereon a second guest, a second NIC communicatively connected to the physical network, a second communication port, and a second element of a distributed control logic to control at least the second communication port independently of the first element of the distributed control logic, wherein the first communication port and the second communication port are communicatively connected to constitute a distributed communication element that enables a virtualized network for communication between the first guest and the second guest via the first communication port and the second communication port, respectively; and a media access (MAC) discovery mechanism configured to discover an identifier of the second communication port of the second guest operating system using an address discovery protocol to enable a virtualized network for communication between the first virtualized guest and the second virtualized guest via the first communication port and the second communication port respectively over the physical network.

Certain exemplary embodiments disclosed herein also include a method for creating an independent overlay of a virtualized network for virtualized hosts over a physical network to allow access between a first virtualized host and a second virtualized host over the physical network, comprising: instantiating a first virtualized communication port for the first virtualized host; instantiating a second virtualized communication port for the second virtualized host; performing a discovery media access control (MAC) address process of the second virtualized communication port identifier by the first virtualized host by broadcasting an address resolution protocol (ARP) packet to the second virtualized host via the second virtualized communication port; sending a ping request from the first virtualized host to the second virtualized host; and creating the independent overlay of the virtualized network to allow communication between the first virtualized host with the second virtualized host, wherein the virtualized network is created over the physical network using a distributed communication element, and wherein a control logic of the distributed communication element is distributed to each of the first virtualized communication port and the second virtualized communication port to execute a respective portion of the switching functionality of the distributed communication element in a distributed manner independently of each other.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
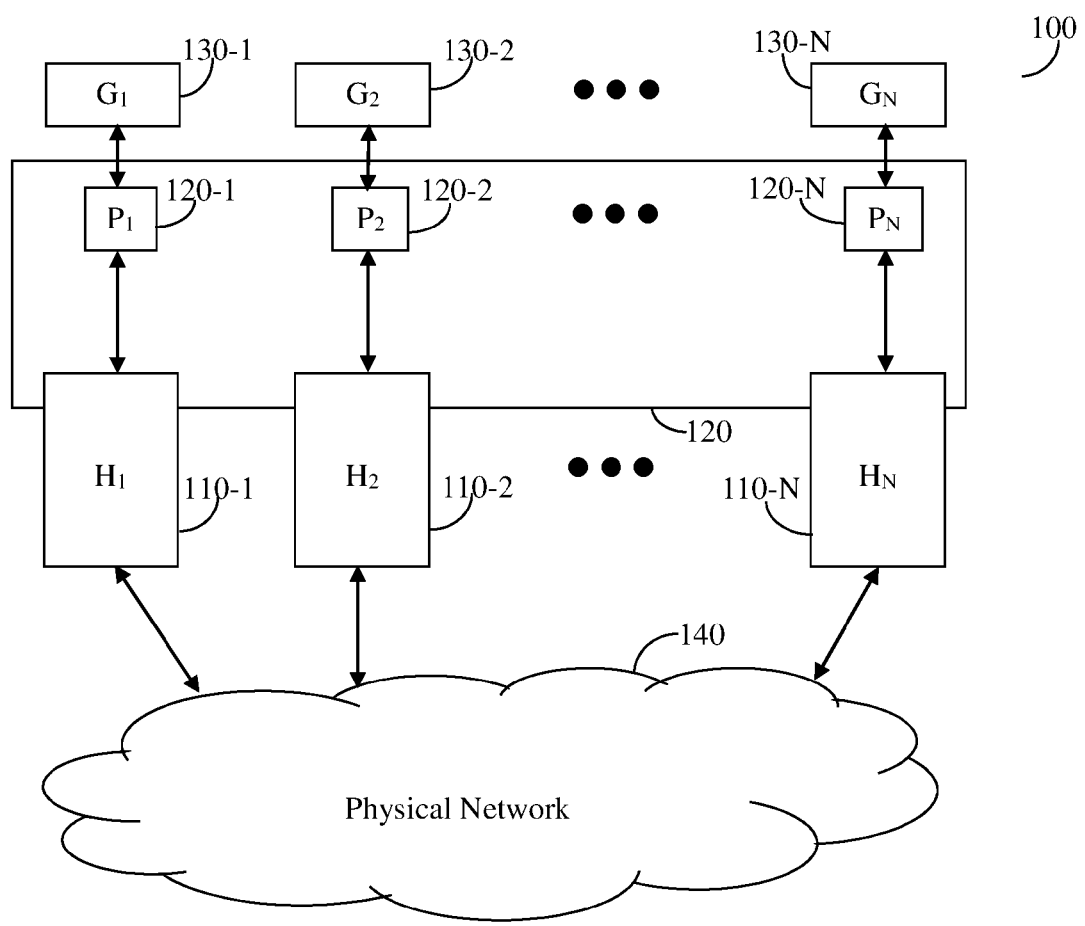
FIG. 1 is a schematic diagram of an embodiment of a system having a distributed switch according to one embodiment.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein provide a distributed communication between operating system guests (hereinafter guests or a guest) of virtual machines in a virtual environment. The embodiments are facilitated in a system comprised of a plurality of hosts, wherein each host executes the operating systems of one or more guests. The guests are connected by a virtualized network formed by means of a distributed network element. In one embodiment, the virtualized network is an overlay network. At least a subset of the guests may be connected via the virtualized network that is unique to the subset of the guests, thereby allowing such guests to communicate over an overlay network without being aware of either the physical network, or of other guests that are not members of the virtualized network.

According to various exemplary embodiments, the virtualized network comprises a distributed network switch having at least a communication port for each guest, each such communication port being communicatively coupled to the other communication ports of the distributed switch. Each host executes the portion of the switch independently of the other hosts, but with awareness thereof. Therefore, the distributed network switch enables hosts to dynamically establish communication over the virtualized network between guests belonging to the virtualized network.

FIG. 1 is an exemplary and non-limiting schematic diagram of an embodiment of a system 100 having a distributed network element 120 according to one embodiment. A plurality of hosts $H_1$ 110-1, $H_2$ 110-2, through $H_N$ 120-N, execute respectively the operating systems of guests $G_1$ 130-1, $G_2$ 130-2, through $G_N$ 130-N respectively. It should be further understood that each host 110 may be, in one embodiment, a physical machine that executes one or more virtual machines (VMs) of one or more hosts, over which one or more guests are executed.

According to the one embodiment, a respective host 110, for example $H_1$ 110-1, provides a communication port, for example communication port $P_1$ 120-1, to the guest, for example, guest $G_1$ 130-1, such that the guest 130-1 may communicate with other guests using its respective communication guest port. The collection of communication guest ports, i.e., communication guest ports $P_1$ 120-1, $P_2$ 120-2, through $P_N$ 120-N, in combination constitute a distributed network element 120.

According to one embodiment, the control logic of the element 120 is distributed to each of the communication ports $P_1$ 120-1 through $P_N$ 120-N so that the switching functionality occurs in a distributed manner. Therefore, when a guest, for example $G_1$ 130-1, wishes to communicate with another guest, for example $G_2$ 130-2, the communication involves communication guest ports (hereinafter "guest ports") $P_1$ 120-1 and $P_2$ 120-2 that perform a distributed switching functionality. Below there is provided additional detail of how this is performed.

It should be noted that in addition to an exemplary case discussed above where a single guest $G_1$ 130-1 is executed on a host $H_1$ 110-1, a plurality of guests may similarly be executed on a single host, e.g., $H_1$ 120-1.

The hosts 110 communicate using a physical network 140, which may include, for example, a local area network (LAN), a wide area network (WAN), a metro area network (MAN), the Internet, the worldwide web (WWW), and the like, whether wired or wireless, and any combination thereof.

The hosts 110 are physically connected through communication ports of network interface cards (NICs) installed in the hosts 110 that enable each host to communicate with other hosts. Each host 110 provides one or more communication ports, i.e., simulated network cards (NIC), to one or more of its guests. Specifically, each communication port provided to a guest is a virtual instance of the NIC of the respective host.

As depicted in FIG. 1, the distributed network element 120 includes a plurality of guest ports P1 120-1 through PN 120-N which are virtual instances of the NICs installed in the host. It should be appreciated that a NIC is a hardware component, thus the NICs provide the hardware layer of the distributed network element 120.

According to the disclosed embodiments, a host runs the logic of its guest ports in a distributed way and independent of each of the other guest ports, and thereby operates the distributed network element 120 as further discussed with reference to FIG. 2. For example, the host $H_1$ 110-1 runs the logic of the guest port $G_1$ 130-1, independently of the logic of the guest port $G_2$ 130-2. The distributed network element 120 may be operated as a distributed router, a distributed switch, any other type of network element without departing from the principles of the invention. The distributed network element 120 in any configuration runs over the hardware layer of the hosts such that their guests are part of the virtualized network.

Figure 2:
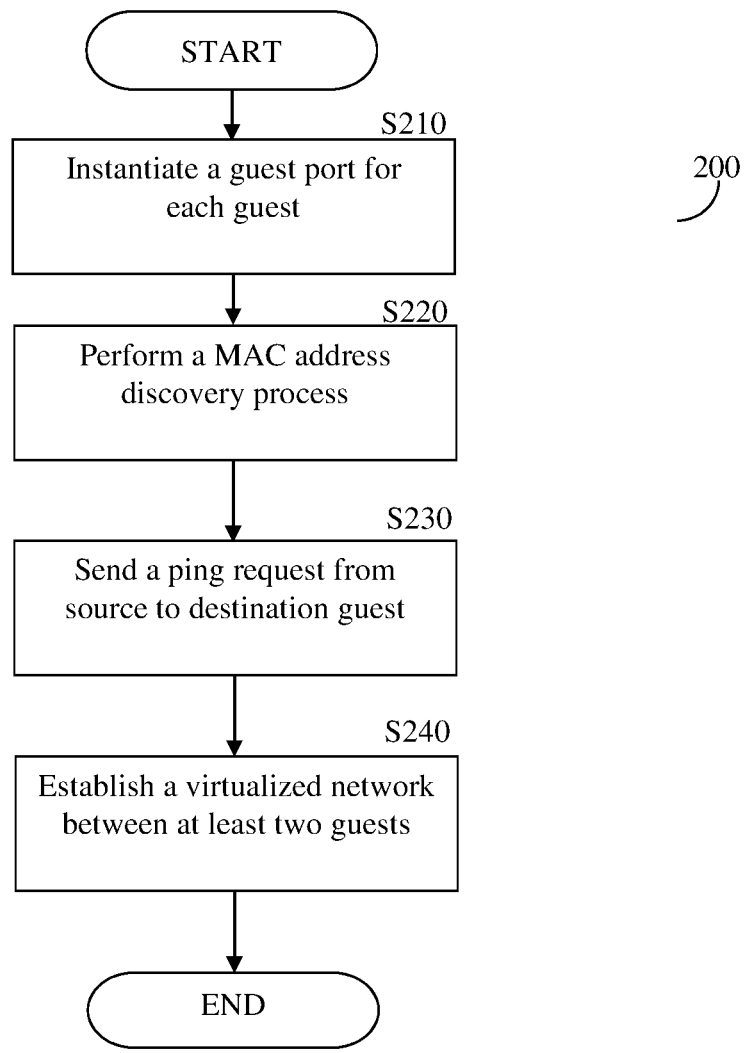
FIG. 2 is a flowchart illustrating the operation of a distributed network element according to one embodiment.

FIG. 2 shows an exemplary and non-limiting flowchart 200 illustrating the operation of the distributed network element 120 implemented according to one embodiment. The following will be described with a reference to a non-limiting switching example where a guest $G_1$ 130-1 tries to ping a guest $G_2$ 130-2.

The communication between the guests executed on different hosts, is performed through a virtualized network formed over the physical network 140. The packets' routing within the virtualized network is facilitated by means of the distributed network element 120. The communication layer between the guests is layer 2 of the standard seven layer model, i.e., the media access control (MAC) layer.

In S210, a guest port is instantiated for each guest virtually connected to the element 120. A guest port is an instance of a NIC on a respective host. For example, $P_1$ 120-1 and $P_2$ 120-2 are guest ports instantiated for guest $G_1$ 130-1 and $G_2$ 130-2 respectively, which are executed over hosts $H_1$ 110-1 and $H_2$ 110-2.

In S220, a MAC address discovery process takes place where a source guest tries to discover the MAC address of each guest port with which communication should be established. With this aim, the source guest sends an address resolution protocol (ARP) packet to discover the MAC address of each destination guest. For example, to establish a communication between $G_1$ 130-1 and $G_2$ 130-2, $G_1$ 130-1 sends through its respective guest port $P_1$ 120-1, an ARP packet. The ARP packet is a broadcast packet. The host $H_1$ 110-1 (in particular its NIC) tunnels the packet received via $P_1$ 130-1 to hosts $H_2$ 110-2 through $H_N$ 110-N, i.e., by broadcasting the ARP packet to all the instantiated guest ports (e.g., ports $P_2$ 130-2, $P_N$ 130-N shown in FIG. 1).

Each host delivers the ARP packet to their respective guest while the hosts receiving the ARP packet learn of the MAC address of the source guest (e.g., guest $G_1$ 130-1). In response to the ARP packet, each destination guest replies with an ARP reply including at least its MAC address. The ARP reply is addressed to the source guest. For example, $G_2$ 130-2 replies with an ARP reply packet designated to $G_1$ 130-1. The ARP reply is tunneled by means of the host of the destination guest (e.g., host $H_2$ 110-2) to the source host (e.g., host $H_1$ 110-1). It should be noted that the ARP reply is not a broadcast packet. The source host (and in particular its NIC) learns the MAC address of each destination guest, through the received ARP replies, and then transfers the received replies to the source guest. For example, the host $H_1$ 110-1 learns the MAC address of the host $G_2$ 130-2 and delivers the ARP packet to the guest $G_1$ 130-1.

In S230, once the guests are identified, the destination guest can ping any of the identified guests. For example, guest $G_1$ 130-1 can send a ping request which is delivered to the guest $G_2$ 130-2. It should be noted that any communication, in a form of packets, messages, requests, and the like, are tunneled through guest ports and the NICs of the respective source hosts, and therefrom to NICs and respective guest ports instantiated for destination guests. For example, the ping request is tunneled from the host $H_1$ 110-1 to host $H_2$ 110-2 through the respective guest ports $P_1$ 120-1 and $P_2$ 120-2. As information moves through the respective hosts and guests the information is kept therein for future use, so that when a guest needs to communicate with another guest it will not be necessary to again go through the entire discovery process described hereinabove.

In S240, a virtualized network is established to connect the source guest with the one or more destination guests. The endpoints of the virtualized network are guest ports instantiated for the guests. Once the virtualized network is formed, guests can communicate between themselves. For example, packets can flow over the virtualized network created between the guest $G_1$ 130-1 and the guest $G_2$ 130-2. In one embodiment, the virtualized network is an overlay network over the physical network 140 connected between the respective hosts (e.g., host $H_1$ 110-1 and $H_2$ 110-2) that host the guests (e.g., guest $G_1$ 130-1 and $G_2$ 130-2).

Therefore, according to the embodiments disclosed herein, a distributed collection of communication guest ports instantiated for respective guests executed over respective hosts are identifiable for the purpose of creating a virtualized network over a physical network. The virtualized network can be realized, for example, as an overlay network. The virtualized network enables communication between guests, while the guests are unaware of the actual physical network utilized for the purpose of communication. Therefore, the source guest does not need to acquire the physical networking addresses (e.g., MAC address, IP address, etc.) of the host hosting the destination guest. Rather, as discussed above, the source guest needs to identify only the guest ports of its destination guests. The guest ports are part of the distributed network element 120.

It should be appreciated that the distributed network element and its operation as discussed herein, would provide significant benefits as it is possible to define virtualized networks for guests executed on hosts without the need to be involved with the physical layer of the communication, thus simplifying the ability of users to create such virtualized environments, for example, using one or more cloud-based infrastructures as discussed below.

It should be understood that according to the disclosed embodiment, each guest and each communication guest port is configured to learn over time the addresses of the guests on the virtualized network. Therefore, the disclosed embodiments allow for a dynamic behavior of the virtualized network as guests are added or removed from the virtualized network.

According to one embodiment, the hosts are aware of the identifier (e.g., MAC address) of one or more of the guest ports 120-1, 120-N of the distributed network element 120. To this end, the hosts may be initially configured with the guest ports' identifier or later set with guest ports' identifiers when new ports are instantiated and/or new hosts are added.

Furthermore, according to one embodiment, when packets are transferred over the physical network 140 tunneling is used. Therefore, the packets are encapsulated to fit the requirements of the physical network 140. The packet encapsulation therefore enables guests that are unaware of the other guest ports' identifiers (e.g., MAC addresses) to learn of the identifiers of the guest ports and the topology of the entire virtualized network. Therefore, guests by processing packets, received at their receptive guest ports, can identify other guests and guest ports that are part of the distributed network element 120. This allows guests to join the virtualized network as needed. It should be noted that a subset of guests can form their own virtualized network to allow communication only among themselves.

The distributed network element 120 as discussed herein also enables effective communication performed over cloud-based infrastructures. That is, if one guest is executed on a first host operative in a first cloud-based infrastructure and a second guest is executed on a second host operative in a second-based infrastructure, that is separate and independent of the first cloud, a virtualized network between the first guest and the second guest can be created using the distributed network element. Moreover, the teachings herein are not limited to a network element and are equally applicable for example, and without limitation, to a network router.

It should be noted that the creation of the virtualized network as discussed above allows connecting between two or more guests hosted by hosts (i.e., separate computing devices) that are connected by the physical network 140. Thus, the hosts are also connected over the virtualized network by the means of the distributed communication element 120. Additional hosts (computing devices) may also become part of the virtualized network using the distributed communication element 120. This is achieved by instantiating one or more guest ports for each new added host for communication with the other guest ports, thereby extending the distributed communication element 120. As the switching logic of each port is run on each host independent of each other, scalability of the computing system is achieved. Moreover, the topology of the virtualized network may be different from the physical network.

The embodiments of the invention disclosed herein can be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers may be combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A non-transitory computer readable medium comprising instructions which, when executed by one or more hardware processors in one or more devices, causes performance of operations comprising:
   executing an independent overlay of a virtualized network for virtualized hosts over a physical network to allow access between a first virtualized guest and a second virtualized guest over the physical network, wherein executing the independent overlay of the virtualized network comprises executing:
   a first virtualized host instantiating thereon a first guest, a first guest port configured exclusively for transmitting data to or from the first guest, and a first element of a distributed control logic to control at least the first guest port, wherein the first virtualized host is connected to a physical network via a first network interface card (NIC);
   a second virtualized host instantiating thereon a second guest, a second guest port configured exclusively for transmitting data to or from the second guest, and a second element of a distributed control logic to control at least the second guest port independently of the first element of the distributed control logic, wherein the first guest port and the second guest port are communicatively connected to constitute a distributed communication element that enables a virtualized network for communication between the first guest and the second guest via the first guest port and the second guest port, respectively, and wherein the second virtualized host is connected to the physical network via a second NIC; and
   a media access (MAC) discovery mechanism configured to discover an identifier of the second guest port of the second guest using an address discovery protocol to enable a virtualized network for communication between the first virtualized guest and the second virtualized guest via the first guest port and the second guest port respectively over the physical network.

2. The medium of claim 1, wherein at least one of the first virtualized host and the second virtualized host executes a virtual machine (VM).

3. The medium of claim 1, wherein each of the first guest port and the second guest port is an instance of the respective NIC of the respective host executing the guest of the respective guest port.

4. The medium of claim 1, wherein the first guest causes an establishment of the virtualized network.

5. The medium of claim 4, wherein the first guest sends a broadcast address resolution protocol (ARP) packet via the first guest port of the first virtualized host to cause the MAC discovery mechanism to discover a MAC address of the second guest, wherein the ARP packet is tunneled via the physical network.

6. The medium of claim 5, wherein the second guest and the second guest port learn a MAC address of the first guest using the received ARP packet.

7. The medium of claim 6, wherein the second guest provides a reply ARP packet to the first guest, wherein the reply ARP packet is tunneled via the physical network to the first guest via the first guest port.

8. The medium of claim 7, wherein the first guest and the first guest port learn a MAC address of the second guest provided in the reply ARP packet.

9. The medium of claim 1, wherein the physical network comprises at least one of: a local area network (LAN), a wide area network (WAN), a metro area network (MAN), Internet, World Wide Web (WWW), a wired network, and a wireless network.

10. A method comprising:
    executing an independent overlay of a virtualized network for virtualized hosts over a physical network to allow access between a first virtualized guest and a second virtualized guest over the physical network, wherein executing the independent overlay of the virtualized network comprises executing:
    a first virtualized host instantiating thereon a first guest, a first guest port configured exclusively for transmitting data to or from the first guest, and a first element of a distributed control logic to control at least the first guest port, wherein the first virtualized host is connected to a physical network via a first network interface card (NIC);
    a second virtualized host instantiating thereon a second guest, a second guest port configured exclusively for transmitting data to or from the second guest, and a second element of a distributed control logic to control at least the second guest port independently of the first element of the distributed control logic, wherein the first guest port and the second guest port are communicatively connected to constitute a distributed communication element that enables a virtualized network for communication between the first guest and the second guest via the first guest port and the second guest port, respectively, and wherein the second virtualized host is connected to the physical network via a second NIC; and
    a media access (MAC) discovery mechanism configured to discover an identifier of the second guest port of the second guest using an address discovery protocol to enable a virtualized network for communication between the first virtualized guest and the second virtualized guest via the first guest port and the second guest port respectively over the physical network,
    wherein the method is executed by one or more devices including a hardware processor.

11. The method of claim 10, wherein at least one of the first virtualized host and the second virtualized host executes a virtual machine (VM).

12. The method of claim 10, wherein each of the first guest port and the second guest port is an instance of the respective NIC of the respective host executing the guest of the respective guest port.

13. The method of claim 10, wherein the first guest causes an establishment of the virtualized network.

14. The method of claim 13, wherein the first guest sends a broadcast address resolution protocol (ARP) packet via the first guest port of the first virtualized host to cause the MAC discovery mechanism to discover a MAC address of the second guest, wherein the ARP packet is tunneled via the physical network.

15. The method of claim 14, wherein the second guest and the second guest port learn a MAC address of the first guest using the received ARP packet.

16. The method of claim 15, wherein the second guest provides a reply ARP packet to the first guest, wherein the reply ARP packet is tunneled via the physical network to the first guest via the first guest port.

17. The method of claim 16, wherein the first guest and the first guest port learn a MAC address of the second guest provided in the reply ARP packet.

18. The method of claim 10, wherein the physical network comprises at least one of: a local area network (LAN), a wide area network (WAN), a metro area network (MAN), Internet, World Wide Web (WWW), a wired network, and a wireless network.

\* \* \* \* \*

UNITED STATES PATENT AND TRADEMARK OFFICE
CERTIFICATE OF CORRECTION

| | | |
|---|---|---|
| PATENT NO. | : 9,647,902 B2 | |
| APPLICATION NO. | : 15/082806 | |
| DATED | : May 9, 2017 | |
| INVENTOR(S) | : Alexander Fishman et al. | |

It is certified that error appears in the above-identified patent and that said Letters Patent is hereby corrected as shown below:

On the Title Page

The Assignee, Item (73):
"Redwood Shores, CA (US)"
Should be changed to:
--Ra'anana (IL)--.

Signed and Sealed this
Second Day of July, 2024

Katherine Kelly Vidal
*Director of the United States Patent and Trademark Office*